(12) United States Patent
Sadeghian Marnani et al.

(10) Patent No.: US 9,274,138 B2
(45) Date of Patent: Mar. 1, 2016

(54) HIGH THROUGHPUT SCANNING PROBE MICROSCOPY DEVICE

(71) Applicant: Nederlandse Organisatie voor toegepast-natuurwetenschappelijk onderzoek TNO, Delft (NL)

(72) Inventors: Hamed Sadeghian Marnani, Delft (NL); Teunis Cornelis van den Dool, Delft (NL); Niek Rijnveld, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 0 days.

(21) Appl. No.: 14/410,799

(22) PCT Filed: Jun. 24, 2013

(86) PCT No.: PCT/NL2013/050447
§ 371 (c)(1),
(2) Date: Dec. 23, 2014

(87) PCT Pub. No.: WO2014/003547
PCT Pub. Date: Jan. 3, 2014

(65) Prior Publication Data
US 2015/0185248 A1    Jul. 2, 2015

(30) Foreign Application Priority Data
Jun. 28, 2012 (EP) .................................. 12174204

(51) Int. Cl.
*G01Q 10/04* (2010.01)
*B82Y 35/00* (2011.01)
(Continued)

(52) U.S. Cl.
CPC ............... *G01Q 10/04* (2013.01); *B82Y 35/00* (2013.01); *G01Q 60/38* (2013.01); *G01Q 70/06* (2013.01)

(58) Field of Classification Search
CPC ....... G01Q 70/06; G01Q 10/02; G01Q 10/04; G01Q 60/16; G01Q 60/22; G01Q 60/38

USPC ..................... 850/1, 3, 5, 6, 33, 40
See application file for complete search history.

(56) References Cited

U.S. PATENT DOCUMENTS

| 5,835,477 A | 11/1998 | Binnig |
| 6,337,479 B1 * | 1/2002 | Kley ............................ 250/234 |

(Continued)

FOREIGN PATENT DOCUMENTS

| JP | 2002139414 A | 5/2002 |
| JP | 2005300177 A | 10/2005 |

OTHER PUBLICATIONS

Minne et al., "Autmated parallel high-speed atomic force microscopy", Appl. Phys. Lett. 72, 2340 (1998), pp. 2340-2342.

(Continued)

*Primary Examiner* — Michael Maskell
(74) *Attorney, Agent, or Firm* — Knobbe, Martens, Olson & Bear, LLP

(57) ABSTRACT

A scanning probe microscopy device for mapping nanostructures on a sample surface of a sample is provided. The device may comprise a plurality probes for scanning the sample surface, and one or more motion actuators for enabling motion of the probes relative to the sample, wherein each of the plurality of probes comprises a probing tip mounted on a cantilever arranged for bringing the probing tip in contact with the sampling surface for enabling the scanning. The device may further comprise a plurality of Z-position detectors for determining a position of each probing tip along a Z-direction when the probing tip is in contact with the sample surface, wherein the Z-direction is a direction transverse to the sample surface, for enabling mapping of the nanostructures.

15 Claims, 8 Drawing Sheets

(51) Int. Cl.
*G01Q 60/38* (2010.01)
*G01Q 70/06* (2010.01)

(56) References Cited

U.S. PATENT DOCUMENTS

| | | |
|---|---|---|
| 6,545,273 B1 | 4/2003 | Singh |
| 7,022,976 B1 * | 4/2006 | Santana et al. ............... 250/234 |
| 7,302,832 B2 | 12/2007 | Berlin |
| 7,571,638 B1 * | 8/2009 | Kley ............................. 73/105 |
| 2005/0269035 A1 * | 12/2005 | Kawakami et al. .......... 156/598 |

OTHER PUBLICATIONS

International Search Report dated Aug. 6, 2013 for PCT/NL2013/050447.

Written Opinion dated Aug. 6, 2013 for PCT/NL2013/050447.

* cited by examiner

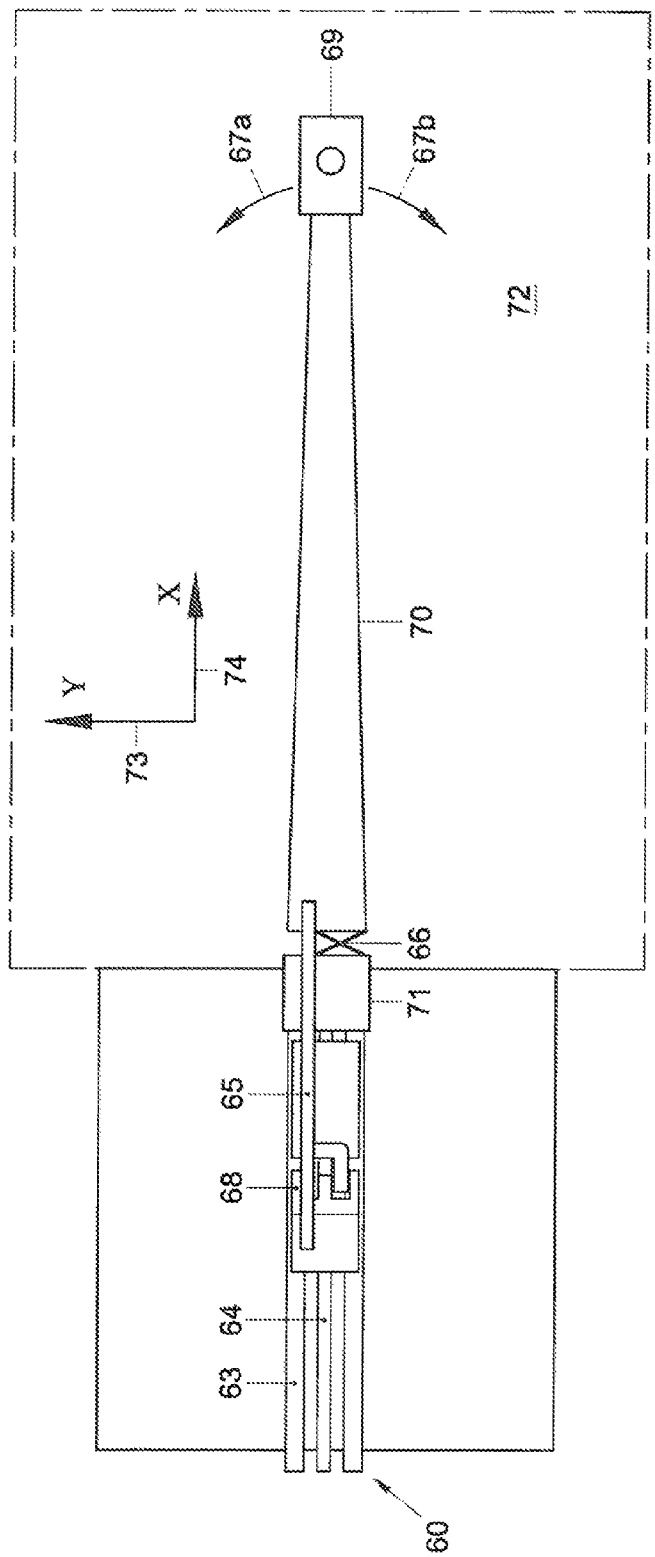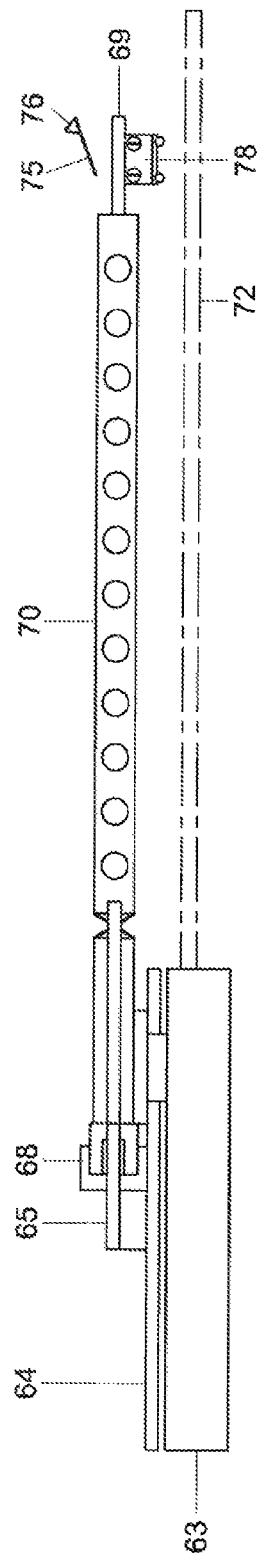
Fig. 4A
Fig. 4B

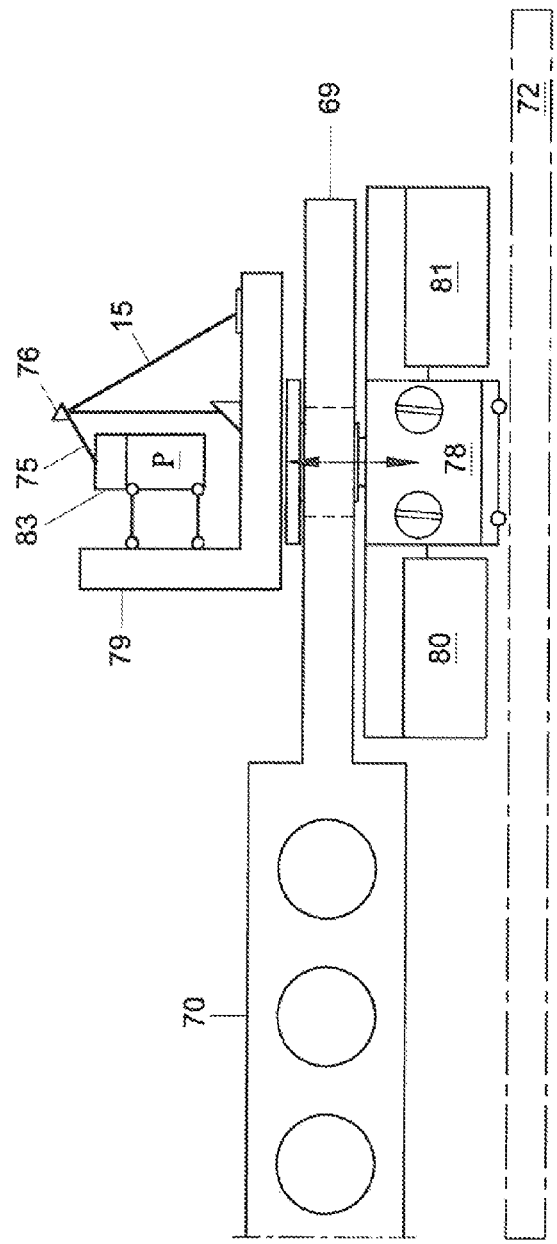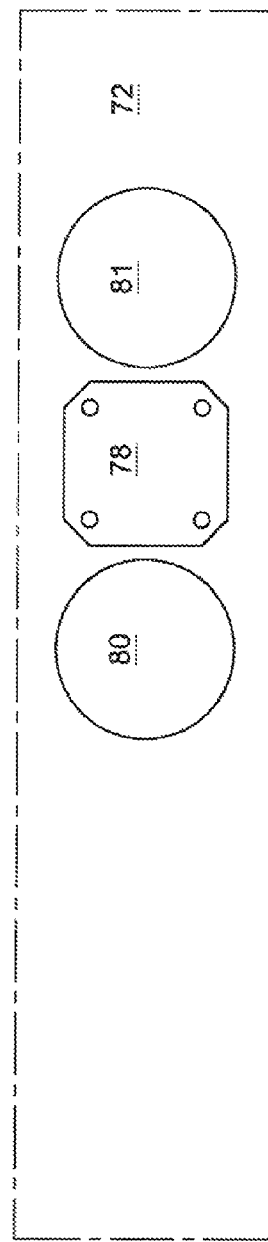

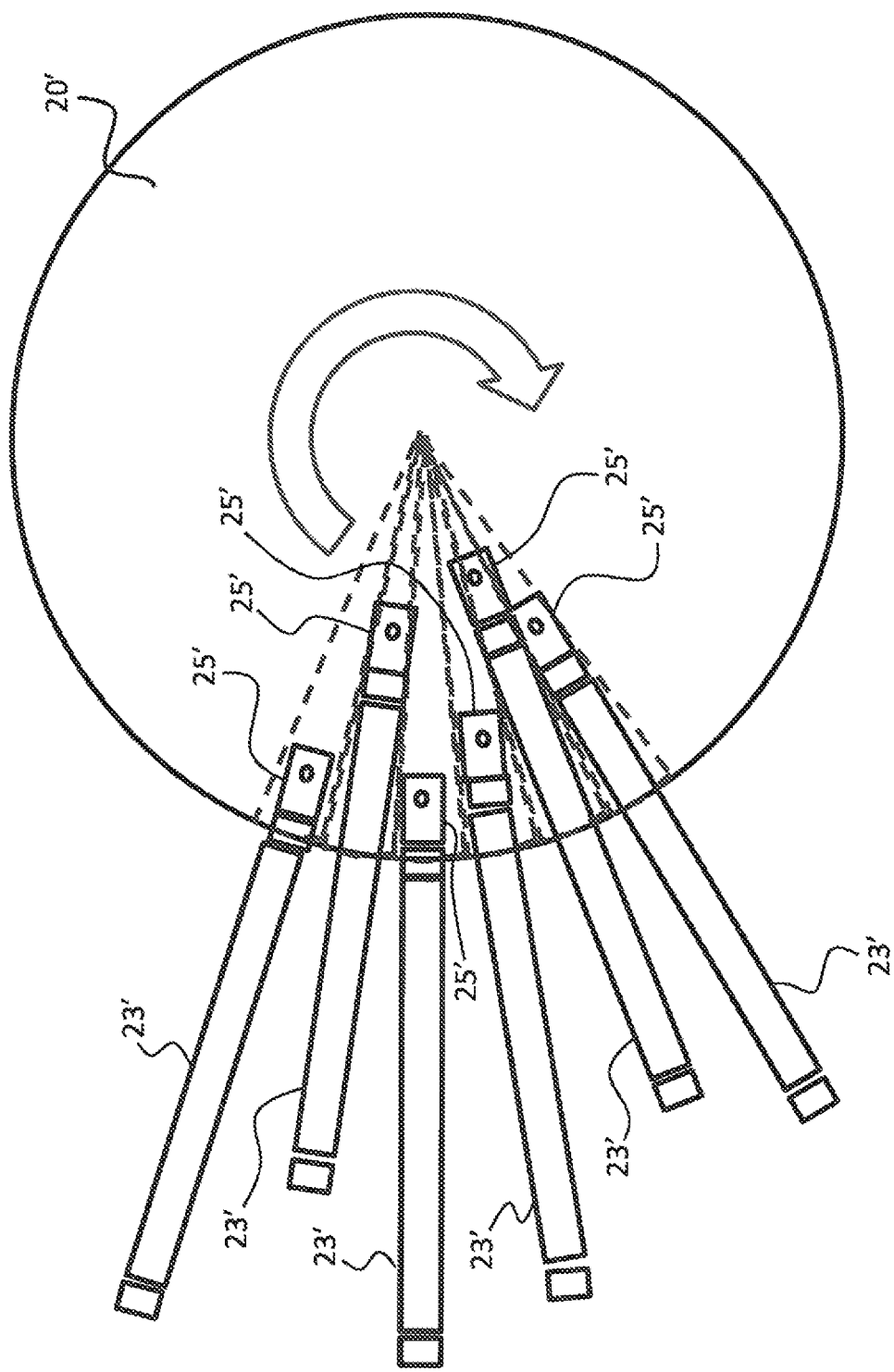

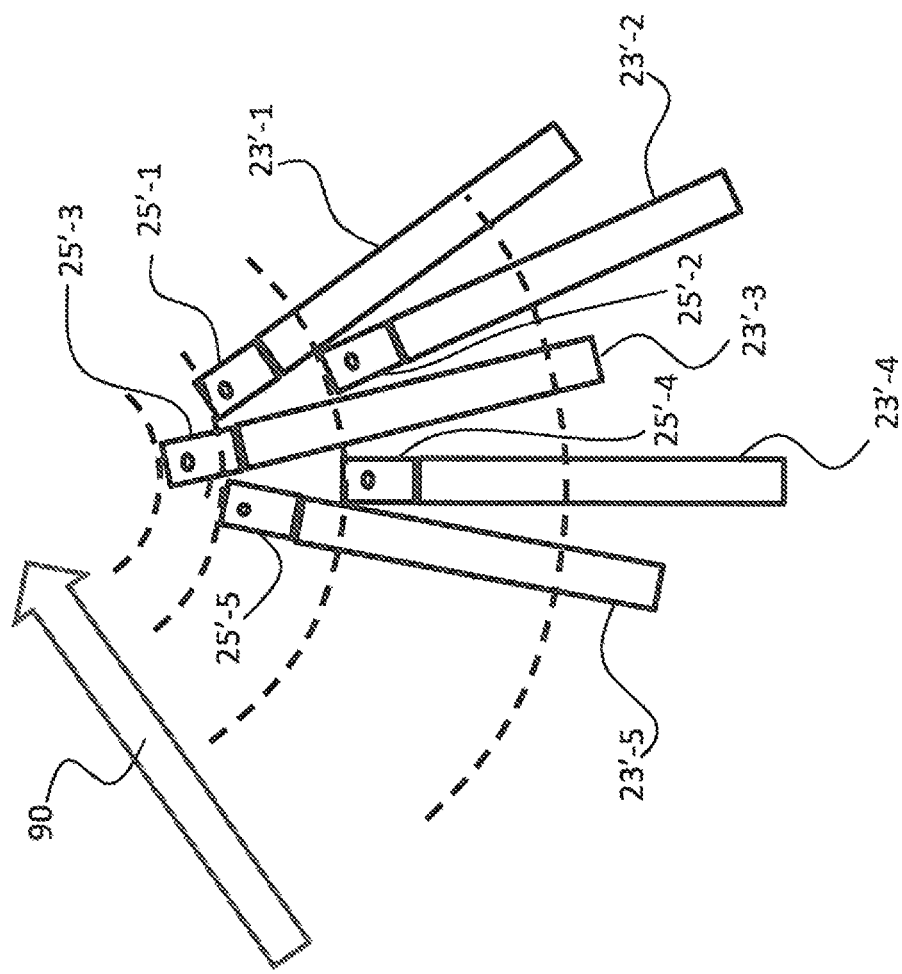

HIGH THROUGHPUT SCANNING PROBE MICROSCOPY DEVICE

CROSS REFERENCE TO RELATED APPLICATIONS

This application is the U.S. National Phase of International Application No. PCT/NL2013/050447, filed Jun. 24, 2013, designating the U.S. and published in English as WO 2014/003547 on Jan. 3, 2014 which claims the benefit of European Patent Application No. EP 12174204.3 filed Jun. 28, 2012.

FIELD OF THE INVENTION

The present invention is directed to an scanning probe microscopy device for mapping nanostructures on a sample surface of a sample, comprising a plurality probes for scanning the sample surface, and one or more motion actuators for enabling motion of the probes relative to the sample, wherein each of said plurality of probes comprises a probing tip mounted on a cantilever arranged for bringing the probing tip in contact with the sampling surface for enabling the scanning, the device further comprising a plurality of Z-position detectors for determining a position of each probing tip along a Z-direction when the probing tip is in contact with the sample surface, wherein the Z-direction is a direction transverse to the sample surface, for enabling mapping of the nanostructures.

BACKGROUND

Scanning probe microscopy (SPM) devices, such as atomic force microscopy (AFM) devices as described above are for example applied in the semiconductor industry for scanning of semiconductor topologies on a surface. Other uses of this technology are found in biomedical industry, nanotechnology, and scientific applications. In particular, AFM may be used for critical defect metrology (CD-metrology), particle scanning, stress- and roughness measurements. AFM microscopy allows visualization of surfaces at very high accuracy, enabling visualization of surface elements at sub-nanometer resolution.

The very high resolution and accuracy of this technology however comes at the cost of performance in terms of throughput. Atomic force microscopy is performed by tracing of a sample surface in a scanning motion using a probe tip touching or tapping (i.e. repeatedly touching) the surface, while accurately measuring disposition of the probe tip in a direction transverse to the sample surface (z-direction) using for example a high precision optical sensing system, e.g. using beam deflection or an interferometer. Scanning is performed by vibrating the tip in the z-direction, while performing the scanning motion across the surface to be mapped. To accurately map a given section of a sample surface, e.g. a structure on a wafer surface, the probe tip requires to be scanned such that every fraction of the section with sub-nanometer dimensions is touched or tapped by the probe tip at least once. As will be appreciated, this process may be rather slow.

Further development of the SPM technology has provided AFM systems comprising a probe head upon which a plurality of probes are mounted side by side. Each probe comprises a cantilever and a probe tip, and each probe tips position in z-direction is measureable independently. This allows for scanning of a plurality of 'scanning lanes' at one pass of the scanning head, and as will be appreciated, the speed at which a single section may be scanned is multiplied by the number of probe tips present on the head.

Even though the above has lead to an improvement in throughput, the scanning of multiple sites on a sample surface still takes a considerable amount of time. For this and other reasons, application of this technique in industrial environments, for example for the testing of wafers in semiconductor industry, is far from ideal.

SUMMARY OF THE INVENTION

It is an object of the present invention to alleviate the abovementioned problems of the prior art, and to provide a scanning probe microscopy device that allows for high speed high throughput scanning of multiple sites on a sampling surface.

The above mentioned and other objects of the invention are achieved in that there is provided an scanning microscopy device for mapping nanostructures on a sample surface of a sample, comprising a plurality probes for scanning the sample surface, and one or more motion actuators for enabling motion of the probes relative to the sample, wherein each of said plurality of probes comprises a probing tip mounted on a cantilever arranged for bringing the probing tip in contact with the sampling surface for enabling the scanning, the device further comprising a plurality of Z-position detectors for determining a position of each probing tip along a Z-direction when the probing tip is in contact with the sample surface, wherein the Z-direction is a direction transverse to the sample surface, for enabling mapping of the nanostructures; wherein the plurality of probes are mounted on a plurality of heads, each head comprising one or more of said plurality of probes; wherein each of said heads is mounted on a support base associated with said head, each support base being arranged for individually moving its associated head relative to the sample; and wherein, for enabling said individual motion of the associated head, each support base comprises a plane actuator unit comprising at least one of said motion actuators for moving the head associated with the support base relative to the sample in at least one direction parallel to the sample surface, wherein the plane actuator unit is located at a first mounting position along said support base, said first mounting position being remote from a second mounting position, wherein the head associated with the support base is mounted on the second mounting position on the support base.

The scanning probe microscopy device of the present invention may for example be an atomic force microscopy (AFM) device. Although in the present document reference will be made to particularly the embodiment of an atomic force microscopy device, the teachings of this document are not restricted to such an application, and may be applied to similar devices in the field of: BEEM, ballistic electron emission microscopy; CFM, chemical force microscopy; C-AFM, conductive atomic force microscopy; ECSTM electrochemical scanning tunneling microscope; EFM, electrostatic force microscopy; FluidFM, fluidic force microscope; FMM, force modulation microscopy; FOSPM, feature-oriented scanning probe microscopy; KPFM, kelvin probe force microscopy; MFM, magnetic force microscopy; MRFM, magnetic resonance force microscopy; NSOM, near-field scanning optical microscopy (or SNOM, scanning near-field optical microscopy); PFM, Piezoresponse Force Microscopy; PSTM, photon scanning tunneling microscopy; PTMS, photothermal microspectroscopy/microscopy; SCM, scanning capacitance microscopy; SECM, scanning electrochemical microscopy; SGM, scanning gate microscopy.

In accordance with most embodiments, the support bases comprising the probe heads will be embodied as support arms. With respect to such embodiments, the term 'support base' used in this document is to be interpreted as 'support arm'. As will be appreciated, the concept of the invention may be implemented using different type of support bases.

A scanning probe microscopy device, such as an atomic force microscopy device, uses actuators for enabling motion of it's probing tips in three orthogonal directions relative the sampling surface. As already indicated, the tip must be movable in the z-direction which is usually implemented by applying a vibration to the probe tip in this direction. For scanning the surface, the probe tip is to be moved in two orthogonal directions parallel to the sampling surface.

In accordance with the inventive principle, the actuators for moving a head comprising the at least one probe tip parallel to the sampling surface, are located remotely from the mounting position of the head on the support base or support arm. The plane actuator unit for moving the head in-plane with respect to the sampling surface is placed at a distance away from the head, where there is more room available for accommodating the actuators. This released constraints on the head, and enables to provide the head being much smaller. As a result, the inventive atomic force microscopy device can be equipped with multiple support bases or arms, each base carrying a head, and each head comprising one or more probes with probing tips. Each arm comprises its own plane actuator unit, allowing individual motion of each support base, independently from other bases.

As a result, the atomic force microscopy device of the invention allows for the simultaneous scanning of multiple remote sites on a single sampling surface, where each site may be scanned at the typical scanning speeds of a conventional microscope. The throughput is therefore multiplied by the number of support bases or support arms applied, which reduces the processing time considerably. For example, suppose that a convention AFM method requires 40 seconds for scanning a single site of 10 μm*10 μm. A wafer comprising 50 sites to be tested will take more than half an hour when it is tested using the conventional AFM method. Suppose the inventive AFM method is applied in an AFM device with 50 individually movable and controllable support bases or arms, this wafer may be tested in only 40 seconds. As will be appreciated, the amount of support bases or arms provided is only limited by the design of the device, and is not restricted to the specific example of 50 bases or arms. A device with 30 bases or arms would require 80 seconds for scanning all sites: the first 30 sites in the first pass, and the remaining 20 sites in a second pass.

In a specific embodiment, the first mounting position is located near a first end of the support arm, and wherein the second mounting position is located near a second end of the support arm. In this embodiment, the actuators may be placed aligned with the axial direction through the support arm, in the extended direction thereof. Most flexibility in the design is achieved in this manner, and it further allows more support arms to be placed adjacent each other (due to absence of actuators and control parts to the side of the support arms), thereby increasing throughput.

Although in principle, any two orthogonal directions according to any coordinate system may be used, in accordance with an embodiment of the invention, for one or more of said support bases or arms, the plane actuator unit of each of said one or more support arms comprises at least one of an X-direction motion actuator and a Y-direction motion actuator. Here the X- and Y-direction may be perpendicular directions parallel to the sampling surface corresponding to a Cartesian coordinate system.

In a particular embodiment, the X-direction actuator comprises a linear shift actuator for moving the second end along the X-direction. In another particular embodiment, the Y-direction actuator comprises a rotational actuator for pivoting the support base or arm such as to move the second end in the Y-direction. With respect to this latter embodiment, it is to be said that the pivoting action of the support bases or arms for providing the Y-directional motion avoids conflicts between support arms obstructing each other during scanning.

According to a particular embodiment, the rotational actuator comprises a hinge element for rotating the support arm in a plane parallel to the sample surface in use, said hinge element cooperating with a further linear shift actuator for providing the rotating action of the support arm. This allows for a very precise positioning of the probe tip relative to the sampling surface in the Y-direction. Moreover, to even increase precision, in accordance with a further embodiment, the hinge element comprises at least one element of a group comprising a cross hinge, a Haberland hinge, or a hinge comprising one or more leaf springs. Furthermore, again for allowing high precision positioning of the probe tip, in some embodiments the further linear shift actuator cooperating with the hinge element is arranged for acting on said support arm in a direction parallel to an axial direction through the arm and in an off-axis position thereof such as to enable pivoting of the arm by means of the hinge element.

In an atomic force microscopy device in accordance with embodiments of the invention, each support base or arm may further comprises a Z-direction actuator for moving the probing tip in the Z-direction. The Z-direction actuator may comprise a Z-positioning actuator for bringing the probing tip to and from the sample surface, and/or a Z-vibration actuator for vibrating the probing tip in the Z-direction adjacent the sampling surface for enabling said scanning of said sample surface. According to some embodiments, the Z-direction actuator is located at the second mounting position of the support base or arm, mounted on or near the head. Mounting the Z-direction actuator on the head allows for the very precise and accurate stroke required in this direction.

Embodiments of the atomic force microscopy device in accordance with the invention may further comprise a motion control locator unit arranged for determining in use a current position of each of the heads relative to the sample surface in at least a direction parallel to the sample surface. As will be appreciated, the motion control locator allows for controlling motion of the support bases or arms by providing precise information on the location of each head and associated arm. This may be implemented in that the motion control locator unit comprises a grid formed by an arrangement of optical references, and wherein each head comprises an optical sensor for detecting the optical references, wherein said grid is arranged substantially parallel to the sample surface at an opposite position of the support bases or arms relative to the sample surface, such that the support bases or arms are in between the sensor grid and the sample surface in use. The references may comprise optically contrasting regions, e.g. reflective regions and absorptive regions. In conventional AFM methods, the location of the head (i.e. X-Y-position) is measured from the side of the sampling surface with optical sensors. In the present invention, an optical path from the side to some of the heads may become obstructed by other arms and heads. Therefore, a new type of locator unit has been developed for use in some embodiments of the invention where the above problem of obstructed view may play part.

The location is measured using a grid at an opposite side of the arm and head with respect to the sampling surface in use.

As will be appreciated, an atomic force microscopy device in accordance with the invention, may further comprise a sample carrier arranged for receiving said sample in use, such as a wafer. Moreover, in accordance with some particular embodiments, relative to a gravitational direction, the heads are located above the optical reference grid, and the sample carrier is located above the heads, wherein the sample carrier is arranged for exposing the sample surface at a side facing the heads. This is a very convenient arrangement of functional layers in the device, as having the sample carrier on top allows for easy access to the sample carrier such as to replace the sample efficiently. At the same time, having the optical reference grid directly underneath the arms, opposite to the sample surface allows for accurate determination of the location of the heads and the probe tips at close distance. As a further improvement, the support base associated with each head can be locked with high stiffness to the grid, thus providing a stable reference for the topography measurement. The term actuator used throughout this document may include any high precision actuator available and known to the skilled person, including piezo-electric actuators, stepper motors, and the like.

According to a further embodiment, the plane actuation unit associated with each support base is mounted directly on the support base, providing actuation forces between the support base and a support structure below the support base. As will be appreciated, the above is a mechanical reversion of the earlier embodiments, falling within the scope of the claims.

In accordance with another embodiment, the plurality of heads are mounted on a plurality of support bases, the support bases being arranged in a circular arrangement around a circumference of an area for receiving the sample for extending the support bases over or under the sample in use for enabling scanning of said surface.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIGS. 4A and 4B schematically illustrate a support arm of an atomic force microscope in accordance with the invention;

FIGS. 5A and 5B schematically illustrate an enlarged view of a probe head in an atomic force microscope in accordance with the present invention;

FIGS. 6A and 6B schematically illustrate a further embodiment comprising a circular placement of arms in an atomic force microscopy device in accordance with the present invention.

DETAILED DESCRIPTION

The scanning probe microscopy device of the present invention may for example be an atomic force microscopy (AFM) device. Although in the description below reference will be made to particularly the embodiment of an atomic force microscopy device, the teachings of this document are not restricted to such an application. As will be appreciated the teachings of the invention may be applied to any microscopy device that is based on the principles of scanning a surface region using a probe. Particular fields of applications have been mentioned earlier in this document.

Figure 1:
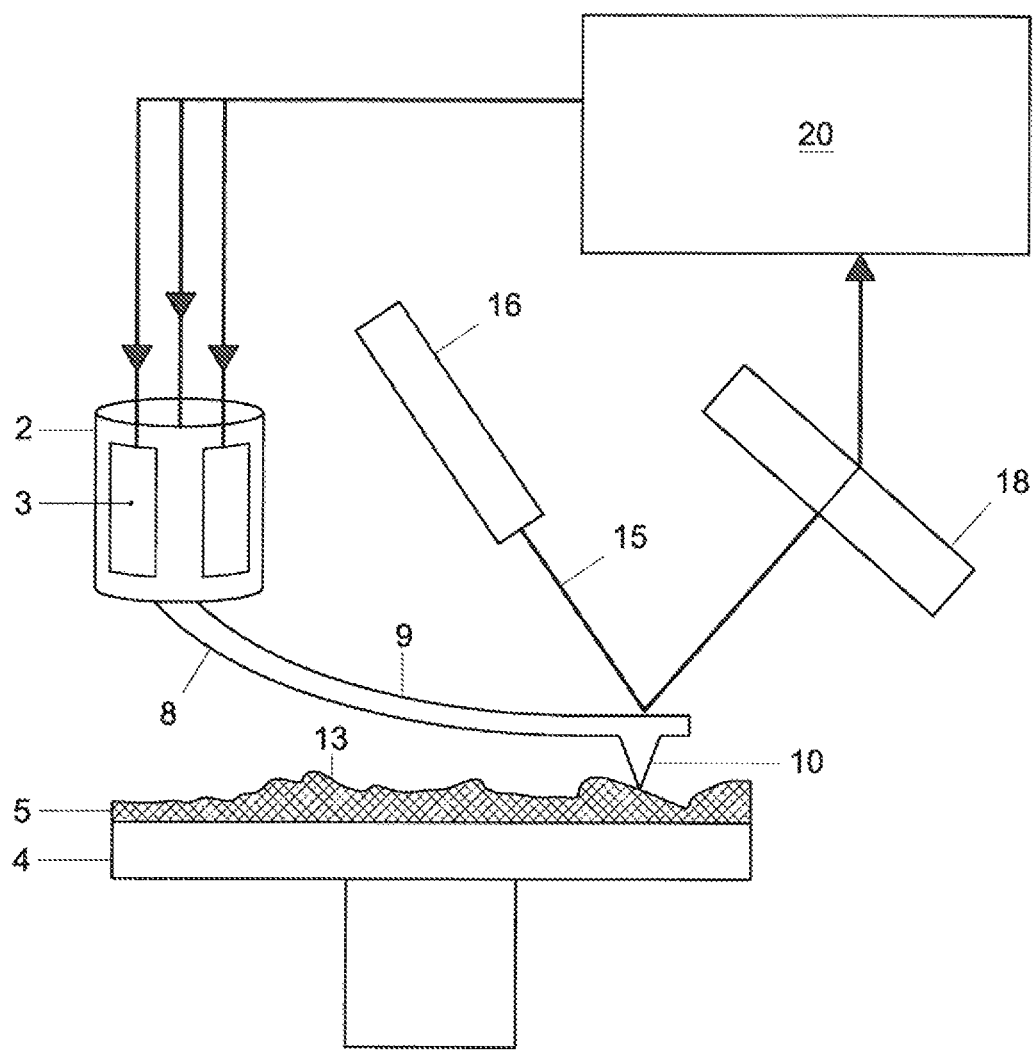
FIG. 1 schematically illustrates the working principle of a typical prior art atomic force microscope.

FIG. 1 schematically illustrates the working principle of a typical prior art atomic force microscope. In FIG. 1, a probe head 2 comprises piezo type drivers 3 for the X-, Y-, and Z-directional motion of a probe 8. The probe 8 consists of a cantilever 9 having a probe tip 10 arranged for scanning a sample surface 5. During scanning, a dither piezo (not shown) may drive the cantilever in vibrational mode, for example close to resonant frequency, to enable tapping of the probe tip on the surface. The manner of applying a vibrational motion to the probe tip is known to the skilled person.

Scanning of the sample surface 5 is performed by moving the probe tip 10 in the X- and Y direction parallel to the sample surface 5 (or alternatively, by moving the substrate surface while maintaining the position of the probe tip fixed in the X- and Y-directions). The probe tip 10 is brought in close proximity to the surface 5 by means of a z-directional piezo driver. Once in the position, the probe tip 10 is vibrated in the z-direction such that it repeatedly touches the surface 5 during scanning thereof. At the same time, a laser 16 illuminates the probe tip with laser beam 15. The precise position in the z-direction is determined using photo diodes 18 which receive the reflected laser beam 15.

The sample surface 5 is carried using a sample carrier 4. Driving of the piezo drivers 3 located on the probe head 2 is performed using the detector and feedback electronics 20. At the same time, the detector and feedback electronics 20 receive the detected z position as determined using photo diodes 18. This principle allows for very precise mapping of surface elements, such as surface element 13 on the sample surface. As described herein above, since the mapping of the surface has to be performed with great precision, the speed at which the method is performed is rather slow.

Figure 2:
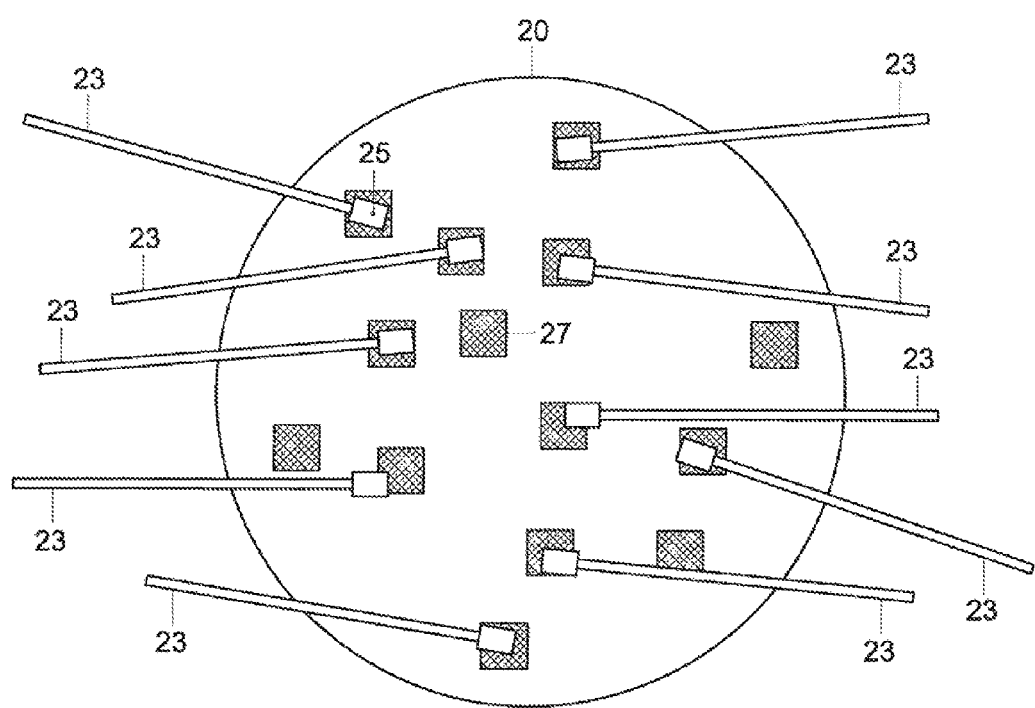
FIG. 2 schematically illustrates the working principle of an atomic force microscope in accordance with the present invention.

FIG. 2 schematically illustrates an atomic force microscope device according to the present invention. FIG. 2 in particular illustrates the working principle of the AFM microscope of the present invention. In particular, AFM microscope of the present invention comprises a plurality of support arms 23, each of the support arms 23 carrying a probe head 25. The support arms 23 can be moved individually and independently from each other such that a plurality of sites 27 on the surface of the wafer 20 can be scanned by the plurality of arms 23 simultaneously. Although the AFM microscope illustrated in FIG. 2 only comprises 10 arms, it may be appreciated that the number of arms is only limited by the design of the AFM microscope. The microscope may easily comprise 20, 30, 40, 50, 60, 70 or more arms dependent on the size of the apparatus and the specific implementation of the principles of the present invention in the AFM microscope according to the embodiments.

Figure 3A:
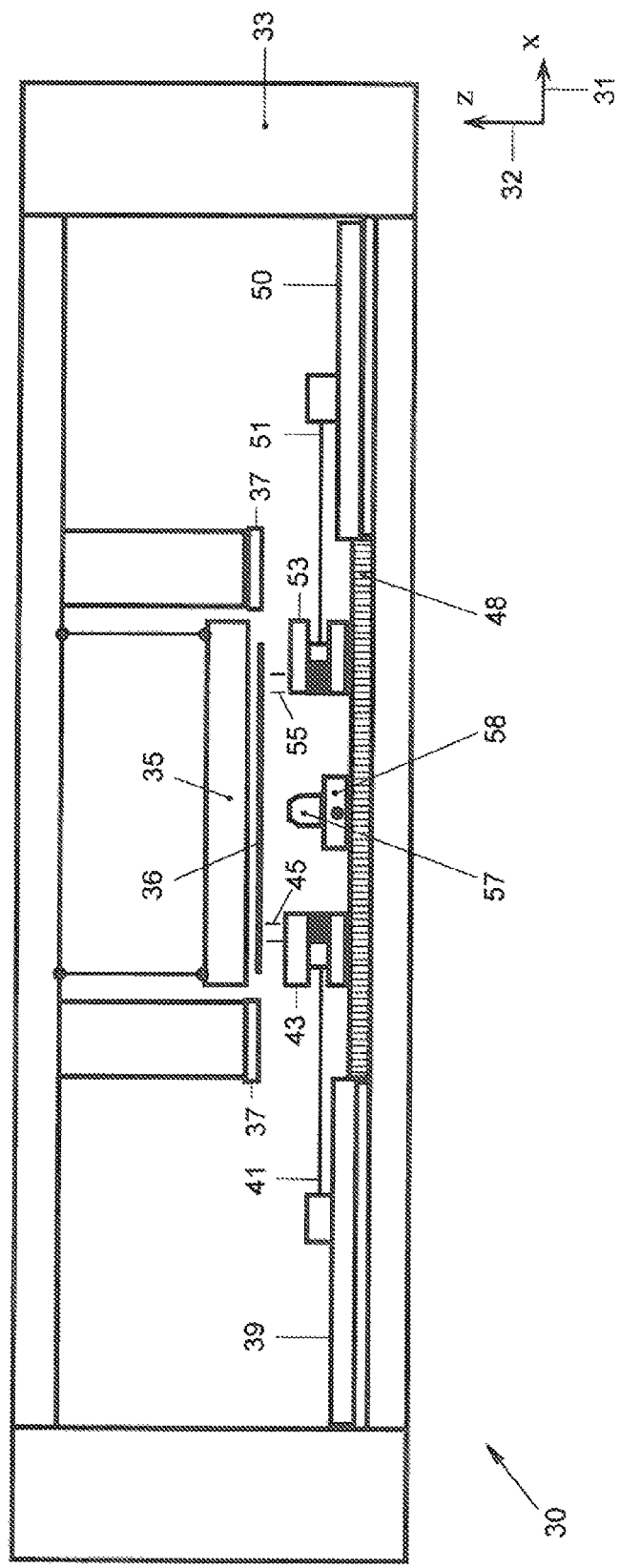
FIGS. 3A and 3B schematically illustrate an atomic force microscopy device in accordance with the present invention.

FIG. 3a is a schematic illustration of an atomic force microscope device in cross section is provided according to an embodiment of the present invention. In FIG. 3a only two of the fifty arms in this embodiment are illustrated. In FIG. 3a, a fixed frame 33 comprises a sample carrier 35 from which there is suspended a wafer 36 forming the sample surface to be scanned using the AFM microscope of the present invention. The elements 37 on either side of the sample carrier 35 provide for calibration of the arrangement, and for replacement of probe tips mounted on the respective probe heads 43 and 53 during the process. The AFM microscope 30 illustrated in FIG. 3a comprises two support arms 41 and 51. Each support arm (41, 51) is mounted on a linear shift actuator 39 and 50 respectively arranged for moving the arms 41 and 51 in the x-direction relative to the sampling surface on wafer 36. The x direction is indicated by arrow 31. The z direction is indicated by arrow 32 in FIG. 3a. Schematically illustrated in FIG. 3a are the probes 45 and 55 comprising the probe tips for scanning the surface of the wafer 36. Also schematically illustrated in FIG. 3a is vision element 58 comprising an imaging unit 57 for visual inspection of the wafer 36 by an operator.

Figure 3B:
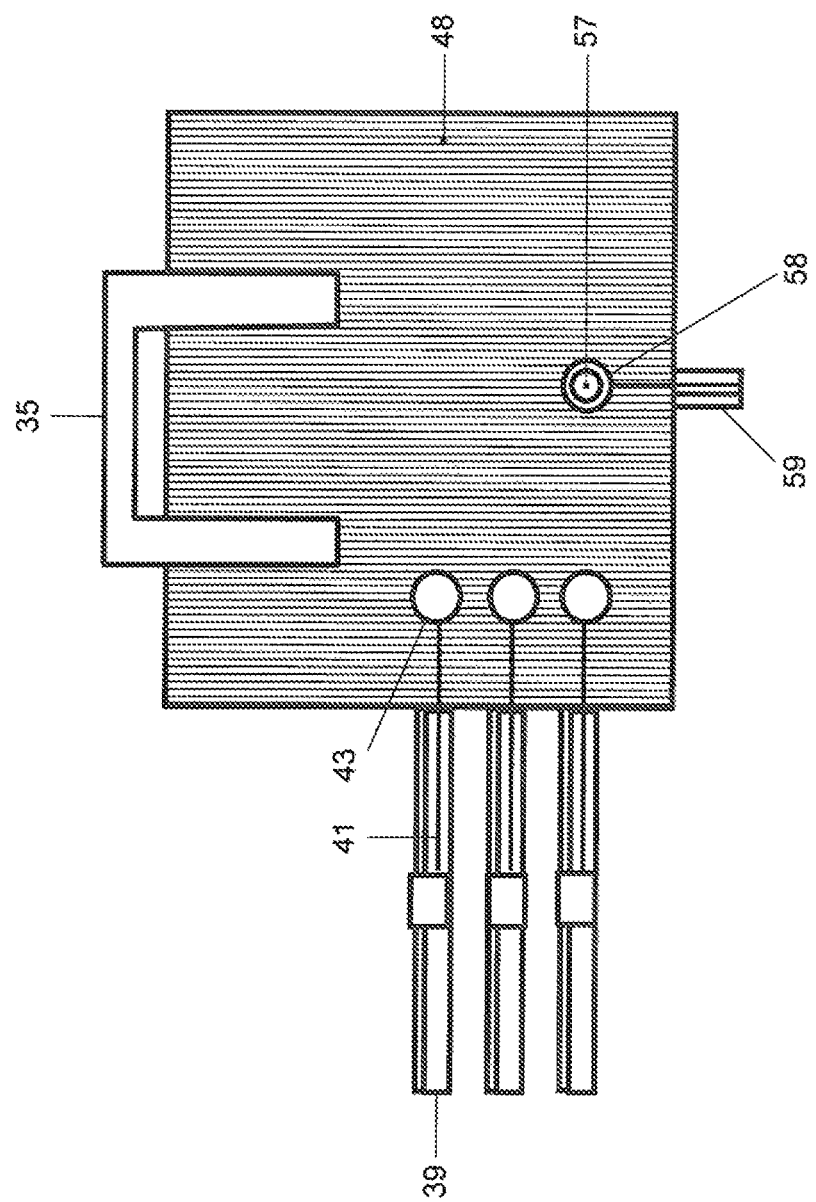

FIG. 3b illustrates schematically a top view of the optical reference grid 48 including part of the support arms (e.g. arm 41). Visible in FIG. 3b are the imaging unit 57 placed on the vision element 58. As illustrated a linear shift actuator 59 allows for moving the imaging unit 57 around underneath the wafer 36.

FIG. 4a is s schematic illustration of a support arm 70 carrying a probe head 67 in an atomic force microscope device according to the present invention. The support arm 70 is moved in the x direction 74 by means of linear shift actuator 60. The linear shift actuator 60 consists of two glider rails 63 and a moving element 64 that can be moved in the direction of the glider rails 63.

In addition thereto, the support arm 70 is further connected to a further linear shift actuator 65 which is moved back and forth by means of element 68. The further linear shift actuator 65 cooperates with hinge element 66 such as to provide a rotational motion schematically indicated by arrows 67a and 67b in FIG. 4a. This enables to move probe head 69 of the support arm 70 in the y direction 73 such as to reach any site on the sample surface (not shown in FIG. 4a).

The hinge element 66 may be an elastic hinge, such as a cross hinge or a Haberland hinge. The specific position of the probe head 69 (in particular the probe tip (not shown)) can be monitored using the optical reference grid 72 underneath the probe head 69. A side view of the schematic illustration of FIG. 4a is provided in FIG. 4b. This illustrates the rails 63 upon which the linear shift actuator 64 moves the support arm 70 back and forth in the x-direction. On the head 69, the z-direction actuator 78 is present. The z direction actuator 68 is operated for moving the probe tip 76 on the cantilever 75 of the probe head upward and downward in the z direction such as to move it to and from the sample surface. The actuator 78 is further arranged for applying a vibration to the probe tip 76 in the z direction during scanning of the sample surface. This enables mapping of the sample surface in great detail.

FIG. 5a illustrates schematically an enlarged view of the head 69 on the end of the support arms 70 in an atomic force microscope device according to the present invention. The head 69 comprises the z-direction actuator 78. On the z-direction actuator 78, a carrier construction 79 comprises a further piezo element 83 for vibrating the cantilever 75 and the probe tip 76. Also illustrated is the laser 15 used for accurately monitoring the z-position of the probe tip 76 upon touching the surface of the sample.

Underneath the head 69 two encoder heads 80 and 81 cooperate with the optical reference grid 72 for accurately determining the position of the probe head 69. The probe head 69 rests on the optical reference grid plane 72 by means of an air bearing, i.e. by blowing air through small pinholes in the surface 72. FIG. 5b illustrates the foot print of probe head 69 on the surface 72. In FIG. 5b, encoder heads 80 and 81 and the z-direction actuator can be seen. In the invention, the support bases and other components are located in a general fixed frame with sufficient mechanical and thermal stiffness.

FIGS. 6A and 6B schematically illustrate a further embodiment comprising a circular placement of arms in an atomic force microscopy device in accordance with the present invention. In FIG. 6A, a wafer 20' is being examined using an atomic force microscope (AFM) in accordance with an embodiment of the invention. The AFM device comprises a plurality of arms 23' that are placed in a circular arrangement around the circumference of the wafer 20'. Although schematically, FIG. 6A only depicts a total six arms 23' part of the arms are omitted in the drawing in order not to obscure the comprehensibility of FIG. 6A. In practice, any number of arms 23' may be placed around the wafer 20', not only in a part of the circumference but across its full circumference.

The radial arrangement of the arms 23' and the heads 25' attached thereto, allows for a large number of arms to be placed around the wafer (more than 50 heads if desired). Since the throughput of the AFM microscope multiplies with the number of heads (scanning with two heads is twice as fast as compared to scanning with one head), the system in accordance with this embodiment has a very large throughput for scanning wafers. Such a system may therefore be advantageously applied in an industrial environment (although it is not limited thereto). Moreover, the circular arrangement automatically provides sufficient space at the back end of the arm (outside the scanning area) where the actuator are placed.

FIG. 6B schematically illustrates how the arms are operated for enabling most efficient scanning of the whole surface without clashing of the arms in the second embodiment. The arrow 90 points from the edge of the wafer towards the center. In this direction the radius decreases, and therefore the chance of clashing usually increases. At the same time however, surface area to be scanned decreases and therewith the number of areas to be scanned also decrease. The arms are extended in a staggered manner. Arms 23'-2 and 23'-4 have their heads 25'-2 and 25'-4 scanning in the peripheral area of the wafer. In an area more closer to the center, arms 23'-1 and 23'-5 with respective heads 25'-1 and 25'-5 are actively scanning the surface. In the area most close to the center and in the center itself, head 25'-3 of arm 23'-3 is active.

The present invention has been described in terms of some specific embodiments thereof. It will be appreciated that the embodiments shown in the drawings and described here and above are intended for illustrative purposes only, and are not by any manner or means intended to be restrictive on the invention. The context of the invention discussed here is merely restricted by the scope of the appended claims.

What is claimed is:

1. Scanning probe microscopy device for mapping nanostructures on a sample surface of a sample, comprising:
    a plurality probes for scanning the sample surface, and
    one or more motion actuators for enabling motion of the probes relative to the sample,
    wherein each of said plurality of probes comprises a probing tip mounted on a cantilever arranged for bringing the probing tip in contact with the sampling surface for enabling the scanning,
    the device further comprising:
    a plurality of Z-position detectors for determining a position of each probing tip along a Z-direction when the probing tip is in contact with the sample surface,
    wherein the Z-direction is a direction transverse to the sample surface, for enabling mapping of the nanostructures;
    wherein the plurality of probes are mounted on a plurality of heads, each head comprising one or more of said plurality of probes;

wherein each of said heads is mounted on a support base associated with said head, each support base being arranged for individually moving its associated head relative to the sample;

wherein, for enabling said individual motion of the associated head, each support base comprises a plane actuator unit cooperating with the respective support base for enabling individual motion thereof, the plane actuator unit comprising at least one of said motion actuators for moving the head associated with the support base, by said motion of the support base, relative to the sample in at least one direction parallel to the sample surface;

wherein the plane actuator unit is located at a first mounting position along said support base, said first mounting position being remote from a second mounting position; and wherein the head associated with the support base is mounted on the second mounting position on the support base.

2. Scanning probe microscopy device in accordance with claim 1, wherein for one or more of said support bases, the plane actuator unit of each of said one or more support bases comprises at least one of an X-direction motion actuator and a Y-direction motion actuator.

3. Scanning probe microscopy device in accordance with claim 2, wherein the X-direction actuator comprises a linear shift actuator for moving the head associated with the support base along the X-direction.

4. Scanning probe microscopy device in accordance with claim 2, wherein the Y-direction actuator comprises a rotational actuator for pivoting the support base such as to move the head associated with the support base in the Y-direction.

5. Scanning probe microscopy device in accordance with claim 4, wherein the rotational actuator comprises a hinge element for rotating the support base in a plane parallel to the sample surface in use, said hinge element cooperating with a further linear shift actuator for providing the rotating action of the support base.

6. Scanning probe microscopy device in accordance with claim 5, wherein the hinge element comprises at least one element of a group comprising a cross hinge, a Haberland hinge, or a hinge comprising one or more leaf springs.

7. Scanning probe microscopy device in accordance with claim 5, wherein the further linear shift actuator is arranged for acting on said support base in a direction parallel to an axial direction through said base and in an off-axis position thereof such as to enable pivoting of the base by means of the hinge element.

8. Scanning probe microscopy device in accordance with claim 1, wherein each support base further comprises a Z-direction actuator for moving the probing tip in the Z-direction, wherein the Z-direction actuator comprises at least one of a group comprising a Z-positioning actuator for bringing the probing tip to and from the sample surface, or a Z-vibration actuator for vibrating the probing tip in the Z-direction adjacent the sampling surface for enabling said scanning of said sample surface by means of tapping of the probe tip.

9. Scanning probe microscopy device in accordance with claim 1, further comprising a motion control locator unit arranged for determining in use a current position of each of the heads relative to the sample surface in at least a direction parallel to the sample surface.

10. Scanning probe microscopy device in accordance with claim 9, wherein the motion control locator unit comprises a grid formed by an arrangement of optical references, and wherein each head comprises an optical sensor, wherein said grid is arranged substantially parallel to the sample surface.

11. Scanning probe microscopy device in accordance with claim 1, further comprising a sample carrier arranged for receiving said sample in use, wherein relative to a gravitational direction, the heads are located above the grid, and the sample carrier is located above the heads, wherein the sample carrier is arranged for exposing the sample surface at a side facing the heads.

12. Scanning probe microscopy device in accordance with claim 1, wherein the first mounting position is located near a first end of the support base, and wherein the second mounting position is located near a second end of the support base.

13. Scanning probe microscopy device in accordance with claim 1, wherein the plane actuator unit associated with each support base is mounted directly on the support base, providing actuation forces between the support base and a support structure below the support base.

14. Scanning probe microscopy device in accordance with claim 10, wherein the support base associated with each head can be locked with high stiffness to the grid, thus providing a stable reference for the topography measurement.

15. Scanning probe microscopy device in accordance with claim 1, wherein the plurality of heads is mounted in a plurality of support bases, the support bases being arranged in a circular arrangement around a circumference of an area for receiving the sample for extending the support bases over or under the sample in use for enabling scanning of said surface.

* * * * *